United States Patent [19]
Fine et al.

[11] 3,840,293
[45] Oct. 8, 1974

[54] ELECTRONICALLY DRIVEN SPIRAL SCAN SYNCHRONOUS TRANSMIT-RECEIVER LASER SYSTEM

[75] Inventors: Martin Fine, Syracuse; Robert E. Glusick, Liverpool; Gordon B. Jacobs, Manlius, all of N.Y.

[73] Assignee: General Electric Company, Syracuse, N.Y.

[22] Filed: July 21, 1972

[21] Appl. No.: 273,828

[52] U.S. Cl............... 350/285, 350/7, 178/7.6
[51] Int. Cl. ................................ G02f 1/34
[58] Field of Search .......... 350/6, 7, 285, 288, 160; 356/4; 178/7.6

[56] References Cited
UNITED STATES PATENTS

| | | | |
|---|---|---|---|
| 2,010,016 | 8/1935 | French | 350/7 |
| 2,975,668 | 3/1961 | Eckel | 350/6 |
| 3,437,393 | 4/1969 | Baker | 350/7 |
| 3,516,743 | 6/1970 | McKown | 350/6 |
| 3,758,199 | 9/1973 | Thaxter | 350/285 |

*Primary Examiner*—Ronald L. Wibert
*Assistant Examiner*—Michael J. Tokar
*Attorney, Agent, or Firm*—Richard V. Lang; Carl W. Baker; Frank L. Neuhauser

[57] ABSTRACT

An optical scanning system having particular utility in a laser optical radar. A single two-sided mirror generally in line of transmitter-target has one side in each (transmit, receive) optical path. The mirror side in the transmit path along with other optical elements diverts the transmit optical path to proximate parallel course. The mirror side in the receive path reflects reflected radiation to a detector. Driving of the mirror sinusoidally in phase-related manner about three axes separated at 60° in the plane of the mirror will cause a spiral scan of an area. Driving a display simultaneously with the mirror and using the detected reflected radiation to drive display intensity provides a visual reproduction of area scanned.

4 Claims, 9 Drawing Figures

PATENTED OCT 8 1974　　　　　3,840,293
SHEET 1 OF 4
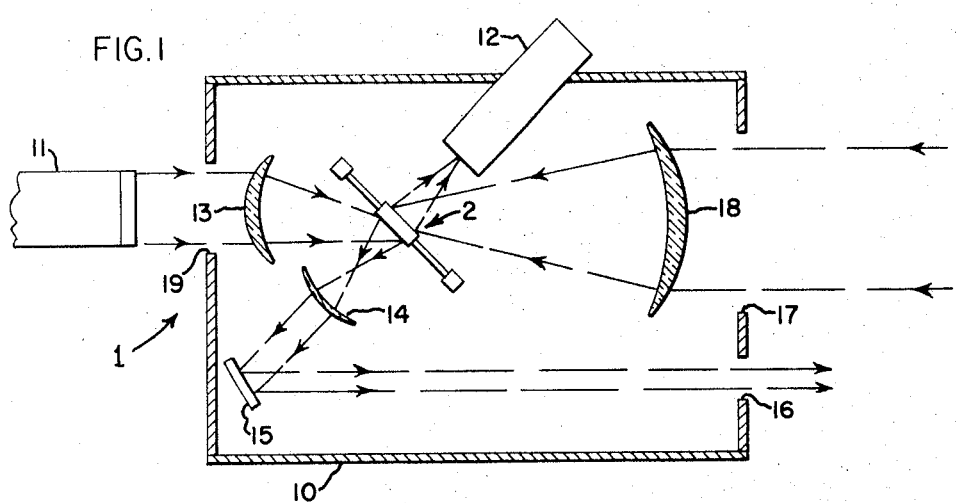
FIG.1
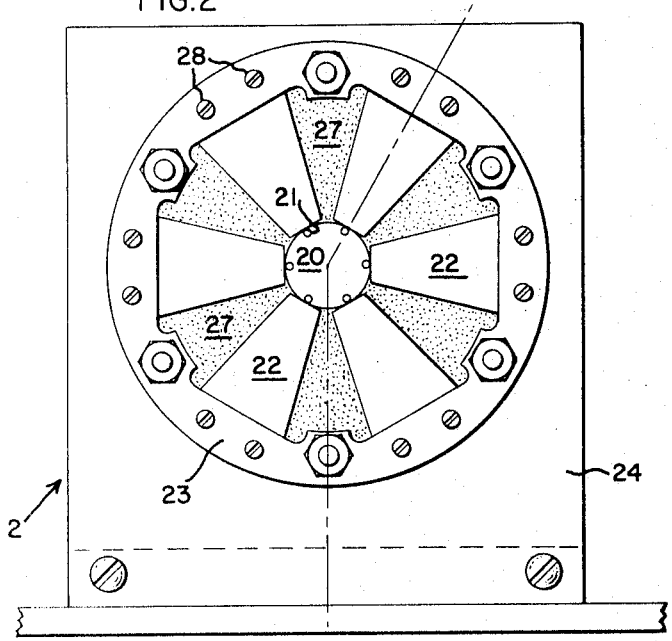
FIG.2
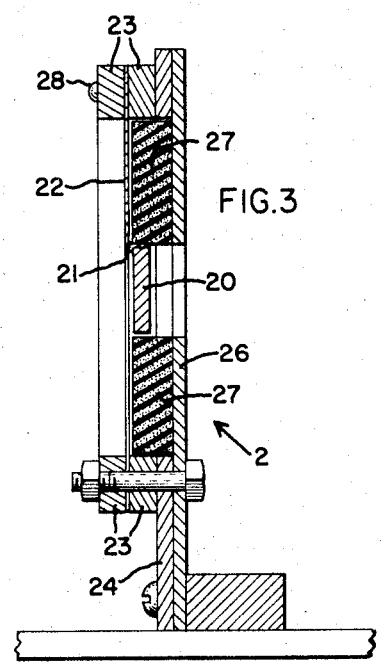
FIG.3
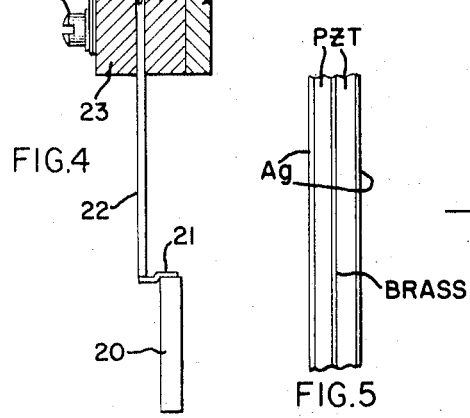
FIG.4
FIG.5
PZT
Ag
BRASS
FIG.7
PULSE GENERATOR
41
42
EXPONENTIAL WAVEFORM GENERATOR
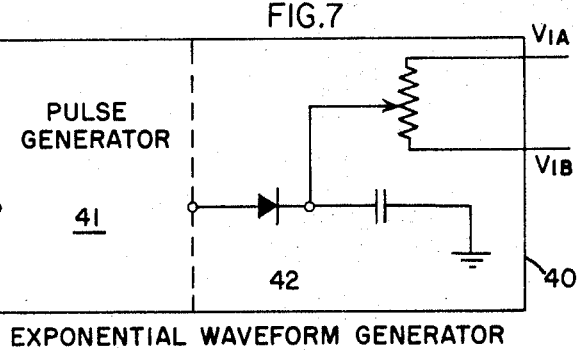

ELECTRONICALLY DRIVEN SPIRAL SCAN SYNCHRONOUS TRANSMIT-RECEIVER LASER SYSTEM

BACKGROUND OF THE INVENTION

1. Field of the Invention

The invention relates to scanning devices utilizing radiation within the broad definition of light. In particular, the invention may be used in a system which could be roughly compared to a radar system using light, and is sometimes referred to as optical radar. In this disclosure the system is described as a laser scanner system although other specific applications are possible. More generally speaking the field of the invention is observation or surveillance by means of electromagnetic radiation or other propagation whether produced by, interdicted by, or reflected by the object observed. Most specifically the invention relates to apparatus and techniques for the coordination, in an optical radar system, of the transmitted and reflected radiation to provide for area scanning with a minimum of radiation losses.

2. Prior Art

In general, radar observation is accomplished by illuminating an area to be observed or illuminating a directionally selected sector of space with a selected electromagnetic radiation, as for example, that part of the spectrum referred to as microwave, and then receiving back that part of the radiation which was reflected from or back scattered by objects receiving the illumination. The directional aspects of radar observation have been handled in several ways including the use of large area illumination in combination with a directionally sensitive receiver, the use of physically keyed transmitters and receivers or the use of transceiver equipment such as, for example, a parabolic reflector in combination with a single antenna that alternately sends and receives.

Previous systems in coherent optical radar have recognized that as an antenna area increases, the increase in captured energy required to improve the signal to noise ratio can be accomplished only by use of a more narrow beam width of radiation. Coverage of a sufficiently large area or conical sector of space to permit practical application of the device requires some form of scanning. Scanning in turn complicates the directional problem. One previous scanning system has used a multimirror shear plate deflector system which includes a mirror for each degree of freedom and a piezoelectric shear plate to oscillate each mirror about an axis. Motion is obtained by driving the piezoelectric element in shear by means of controlled electrical currents. Multimirror systems, as for example, one visible light system that has been used with two mirrors operating in X and Y scan requires that the second mirror to be very large so as to intercept reflections from the first mirror over its entire angular range of motion. The use of common mirror surfaces for transmit and receive allows some of the transmitted radiation to be scattered into the detector. The use of a spiral scan has the advantage over a raster scan of allowing all of a plurality of piezoelectric elements to share the scan load evenly. In raster scan the horizontal drive elements are heavily loaded which might cause a heat build-up resulting in partial or total depoling of the piezoelectric material.

Use of beam splitters in a light beam aiming and reflection detection system would be possible but would produce undesired attenuation and loss of intensity. A system might be made using spinning prisms to produce a raster scan which also permits transmitter backscatter. Separate isolated transmit and receive mirrors might be used to avoid backscatter but applicants know of no art by which the direction of reflected light can be held exactly in synchronism with the direction of the transmitted light beam suitable for use with an optical laser system to produce a spiral scan and particularly a two or more phase, locked, spiral scan.

SUMMARY OF THE INVENTION

This invention contemplates an optical radar system using a novel spiral scan mechanism which permits correlation of the directional aspects of a transmitted beam and the received reflected radiation and is more specifically directed to the electronically driven synchronous spiral scan device which makes the system possible. This synchronous aiming device produces enhanced results when measured by the amount of light radiated or by the amount of required power to produce an acceptable radiation. The gist of the invention is the use of a double-sided mirror supported in a position in which each side of the mirror can be used in one of the two optical paths in combination with support and driving structure which can impart a regular complex oscillatory motion to the mirror so as to cause scanning in a predetermined manner. The regular scanning is preferably circular or elliptical spiral scanning but may be other scanning. The double-sided mirror is supported and driven by piezoelectric elements placed so as to impart a compound motion to the mirror — a regular predetermined motion about two or more axes lying in the plane of the mirror. Briefly in accordance with the preferred embodiment of the invention, there is a laser transmitter; optical elements for the manipulation of transmit beam wherein one optical element is the one side of a two-sided mirror; a detector; and, detector optical elements for focusing and conveying received light to the detector wherein one optical element is the second side of the two-sided mirror. The components are arranged so that the transmitter and the detector, through the optical paths determined by their respective optical elements, are always aimed at the same target, which for practical purposes prescribes generally parallel rays. Control is therefore exercised by movement of the double-sided mirror with the consequential coordinated angular movement of the parallel rays with respect to the other components. The two-sided mirror is supported by an electrically driven piezoelectric system which serves to move the two-sided mirror about a plurality of axes in the plane of the mirror. Electronic circuitry is provided for the purpose of causing deflections in the piezoelectric elements so as to move the mirror. The laser may be a pulsed laser to conserve energy or to permit area coverage by means of a summation of discrete points and it may operate anywhere within that portion of the spectrum of electromagnetic radiation referred to as "light." The only limitation on the selection of wavelength within the term "light" is derived from parameters pertaining to the nature of the optical devices needed and the use to which the system is to be applied.

BRIEF DESCRIPTION OF THE DRAWING

FIG. 1 is a schematic diagram of an optical radar system according to the invention;

FIG. 2 is a face elevation of the two-sided mirror and piezoelectric drive scanning assembly used in FIG. 1;

FIG. 3 is a side elevation in section of the two-sided mirror and piezoelectric drive scanning assembly along the line 3—3 of FIG. 2;

FIG. 4 is a detailed illustration of the two-way mirror and a piezoelectric drive element showing their interconnection;

FIG. 5 illustrates the construction of the transducers;

FIG. 7 illustrates the exponential waveform generator used in the driving circuit;

DESCRIPTION OF A PREFERRED EMBODIMENT

Figure 6:
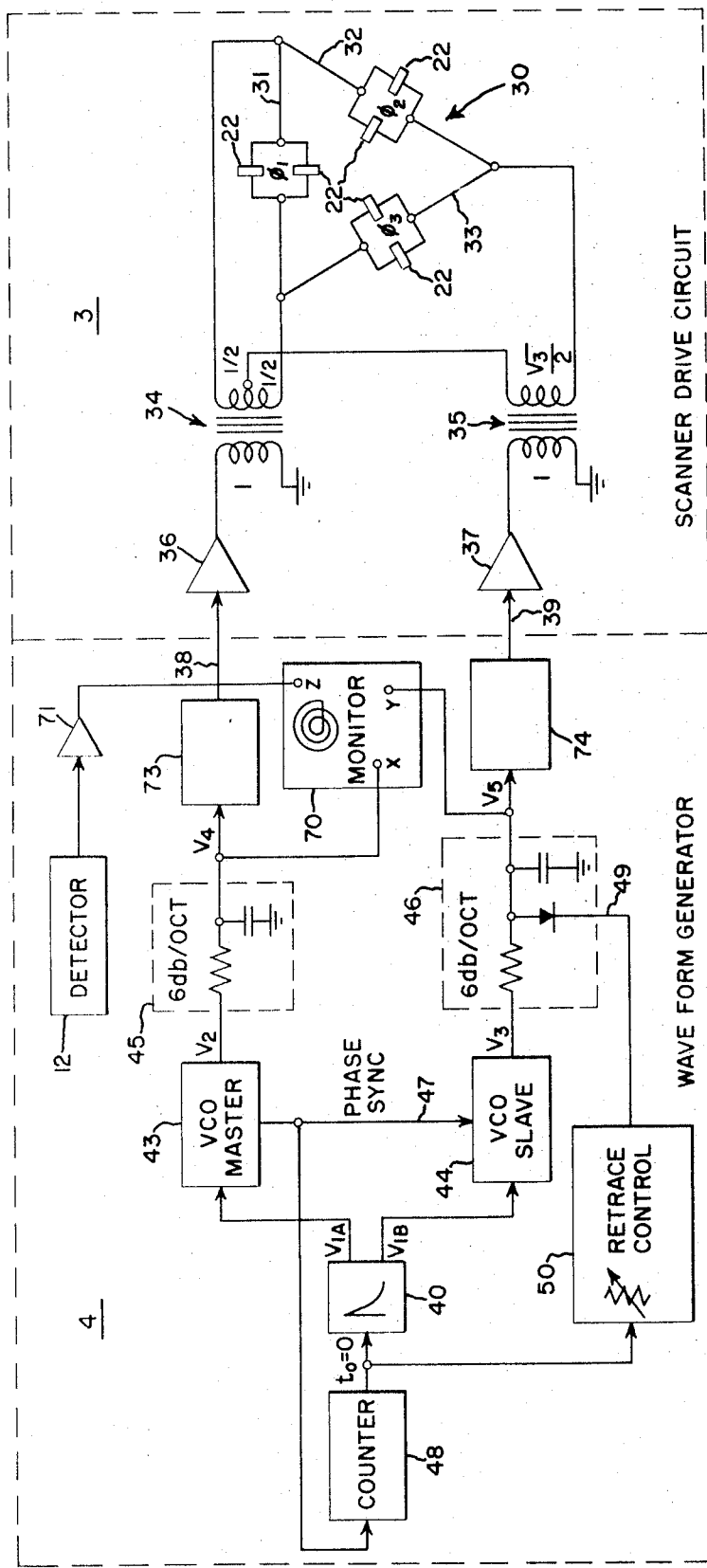
FIG. 6 is a schematic diagram of the electronic driving circuit.

A preferred implementation of our invention of a scanning system as applied to an optical radar is illustrated in FIG. 1. The optical radar 1 may be housed in a suitable container such as 10 and includes a laser transmitter 11, a detector 12, a scanning device 2 and optical elements. The various elements are arranged so that mirror surfaces on both sides of the scanner 2 will enter into the total optical path. One optical path, the transmitting or illuminating path, is determined by the radiation emitted from laser 11 mounted inside of the container or separately mounted as shown in FIG. 1 in such a way that its transmitted radiation enters the unit 1 through a window such as 19. This illuminating radiation is reflected from one surface of scanner 2 and out of the unit in the proper direction as through a window 16. This optical path also includes elements for focusing, collimating or directing, as for example, lenses 13 and 14 and mirror 15. The requirements are that the light incident on the mirror surface of scanner 2 relatively fill the available surface and that movement of the mirror of scanner 2 can impart a directional mobility to a collimated beam transmitted from the unit. A second optical path provides for receipt of radiation after it has been reflected or back scattered by objects illuminated by the transmitted beam. The received light which enters the unit, as for example, through a window 17, is focused onto the mirror surface of the second side of scanner 2 by means of optics represented by lens 18. The detector 12 is located so that it will receive the focused returning light reflected by the scanner 2. The arrangement of the two folded optical paths makes possible the use of a scanner element having fixed, opposed, exteriorly facing, mirror surfaces which when moved demonstrate a synchronous movement. The two mirror surfaces can be parallel or at an angle to each other as long as all of the elements of the optical radar 1 are arranged so that operational movements of the scanner 2 maintain the approximate parallelism of the transmitted and received radiation between unit 1 and the target. It is this feature that permits fixed locations of the laser 11 and detector 12 with reference to each other and with reference to all of the other parts. If, for example, the axes of the laser and of the received radiation are substantially the same and if the axes of detector, scanner and mirror 15 are the same and at 45° to the laser-received radiation axis, there is a constant focus of received radiation into the detector and small variations or movements in the scanner are self-compensating. Since distances involved are extremely short and the mirror drive speed slow when compared with the speed of light, the finite but exceedingly short time delay of the reflected light is inconsequential. In such device only the scanner 2 need be moved and the overall optical radar unit 1 can be made more rugged, reliable and accurate, and can be produced at a lower cost. One additional benefit of this arrangement over those of shearplate mirrors or revolving prisms is the fact that there is no danger of backscatter from the transmitted ray impinging on any of the components with a subsequent reflection into the detector. This in effect prevents the detector from becoming blinded by high intensity lights associated with the illuminating ray.

Although the basic concepts of the invention could be applied over the entire spectrum of light, applicants have implemented the invention using a carbon dioxide ($CO_2$) laser which produces light with a wavelength of 10.6 microns or in other measurements $10.6 \times 10^{-3}$cm or $10.6 \times 10^5$A. The particular wavelength of light is not a part of the invention and is not critical since applicants chose this particular wavelength for other parameters including the fact that the human eye is less subject to damage by light in this portion of the infrared than it is to shorter wavelength light. Another parameter that was involved was the fact that water vapor is more transparent to light at 10.6 microns than it is to lower wavelength light. Obviously operation with the $CO_2$ laser requires optical components other than common glass. The lenses used in this implementation are polycrystalline zinc sulphide which is translucent to visible but highly transparent to infrared radiation. Gold is used for mirror surfaces because in the infrared range it has a better coefficient of reflection than other materials.

THE SCANNER

The scanner 2 which is shown in more detail in face elevation in FIG. 2 and in side elevation section in FIG. 3 is made up of a two-sided mirror 20 which is suspended by wires 21 from a plurality of piezoelectric transducers 22 which are themselves held in place by a pair of compression rings 23. This structure may then be attached to any convenient mounting bracket such as 24. In the embodiment shown in FIG. 2 there are six transducer elements 22 spaced regularly around a round disc-shaped mirror 20. Electrical connection is made by wires attached to terminal screws 28. As shown in the section if FIG. 4 the suspension wires 21 can be fastened between the mirror 20 and its piezoelectric transducer 22. The function of suspension wires 21 is to transmit to the mirror any movements resulting from the flexing of the transducer as the result of applied current. The transducer elements 22 as implemented in this embodiment of the invention are arranged in opposing pairs around the periphery of the mirror. The opposing pairs of transducers 22 are aligned on equally spaced axes passing through the center of mirror 20. A line in the same plane perpendicular to the axis of each such pair of transducers constitutes one axis of the device about which motion of mirror 20 is defined to create a spiral motion. In this instance six transducers are arranged in pairs to define three axes at 60° to each other which in a planar configuration establishes a six phase mechanical system. The transducers and their wiring are arranged in such a fashion that they may be driven by a three phase drive source. Characteristically, because of the polarities involved, opposite transducers operate in a push-pull manner to rotate the mirror 20 about the axes of the devices normal to the transducer axes. Applicants chose a three axes system for their implementation because of the inherent tractability of a three axes system to development of a spiral scanning motion and because of trade-offs in available space and volume efficiency. Any system of two or more axes defined by four or more transducers in even numbers arranged in pairs can be made to impart a sufficient scanning pattern. The spacing of the transducers could be distributed around the mirror 20 to share the acceleration load uniformly, such as 45° - 90° - 45° for an elliptical scan, rather than 60° - 60° - 60° for a circular scan. It would also be possible to use a single transducer on each transducer axis with an opposing anchor to cause each transducer to impart movement to the mirror 20 about a device axis but such arrangement would not provide the desired load sharing from which efficiencies are derived. The additional elements illustrated in FIG. 3 include a mass plate 26 which as used by applicants was a lead plate which served a dual function of shielding the detector from direct radiation from the laser or from back scatter from optics such as lens 14 and to provide sufficient mass to provide rigidity. Ring 27 of damping material, as for example a specially formulated resilient plastic foam material, is used for physical damping of transducer motion. If the alternative of electronic damping 73 and 74 in the driving circuit is used, the material to provide physical damping is unnecessary. As implemented by applicants, the piezoelectric transducers were a sandwich made up of a central brass shim stock of 3 – 4 mils in thickness sandwiched between two layers of piezoelectric ceramic material having the exterior surfaces silverplated to act as electrodes, the entire sandwich being on the order of 24 mils in thickness. These transducers were made trapezoidal in shape to fit around a circular mirror and were made from Clevite PZT 5H elements. The cross section of a transducer shown in FIG. 5 serves to disclose its structure.

THE SCANNER DRIVER

Use of the scanner system as described with reference to FIG. 1 requires that the mirror 20 be moved in some regular fashion which will permit correlation of the direction of the target from which light is reflected with some known direction and some means of displaying, recording or indicating that direction. Although any method of moving mirror 20 according to a regular pattern would be within the more broad concepts of the invention, the most specific form of the invention is implementation by means of a novel motion which takes maximum advantage of the inherent qualities of the piezoelectric material to cause the transmitted beam to describe a spiral pattern displayed on a surface normal to that beam. This arrangement also equalizes the load on the transducers to permit maximizing the deflection of the system while protecting individual transducers from danger of depoling. Consequently the detector is also searching over the same spiral pattern. This spiral as previously explained is accomplished by driving the transducers to cause a motion of the mirror relative to the axes of the device which were defined as lines in the plane of the mirror, each perpendicular to the axis of one pair of transducers. Similar motion about each axis, but with a sequential delay between axes of $360°/n$ (where $n =$ the number of axes), will produce a regular movement of the mirror about a line perpendicular to the plane of the axes of the device at their intersection. This motion if varied cyclically in intensity (with the same $360°/n$ lag) can impart a movement to mirror 20 which resembles the precession of a spinning coin as it decreases in velocity. Alternately, for an elliptical scan, the sequential delay must correspond to the mechanical position of the transducers. Motion is imparted to mirror 20 in our implementation by beamsteering electronics of which FIG. 6 constitutes a schematic diagram. A variable frequency, variable amplitude sinusoidal voltage is applied to each of the three pairs of transducers with a 120° separation in the applied voltage. We have chosen to use a sinusoidal voltage of increasing intensity so as to cause the spiral to spin out from the origin or that is to say from a zero zero point outwardly to the perimeter of an area to be covered. A damped sinusoidal voltage could be used to describe a spiral pattern starting from the periphery and working inwardly to the center with an outwardly directed "fly back." The ultimate solution would be to implement the amplitude variations of the mirror solely by frequency change or by a mechanical means responsive to frequency change. Such arrangement would permit retention of a constant voltage on the transducers to achieve better efficiencies as will be further explained below.

BEAMSTEERING ELECTRONICS

In the beamsteering electronics used to drive the transducers illustrated schematically in FIG. 6, the right-hand portion of that Figure constitutes a scanner drive circuit 3 and the left-hand portion a waveform generator 4. The scanner drive circuit 3 includes the three pairs of transducers 22 arranged in a three-phase delta connection 30 wherein the branches are designated as 31, 32, 33. The loop 30 is connected to the secondary side of two transformers 34 and 35 with branch 31 connected directly to the secondary of transformer 34 and the junction of branches 32 and 33 connected to the secondary winding of transformer 35 and a center tap of transformer 34 to constitute the equivalent of a Scott connection. Transformer 34 with the center tap is 1:1 but transformer 35 has the ratio of $1:\sqrt{3/2}$. This circuit is driven by two input signals which are received by the scanner drive circuit at 38 and 39 and amplified respectively by amplifiers 36 and 37. If these two signals are related as sine and cosine, the voltages in the three branches 31, 32 and 33 of the delta 30 are related as in three-phase current having a phase angle of 120°. To generate the desired spiral, the input signals at 38 and 39 are varying frequency, varying amplitude signals related as sine and cosine. The sine signal introduced at 38 is represented by the equation:

$$v_4 = D/Ae^{-\alpha t} + B \sin[2\pi(Ae^{-\alpha t} + B)t]$$

and the cosine signal introduced at 39 is according to the equation:

$$v_3 = D/Ae^{-\alpha t} + B \cos [2\pi(Ae^{-\alpha t} + B)t]$$

Where A and B are in Hz, $\alpha$ is in 1/seconds, $t$ is time in seconds, and $D$ is volt/Hertz. $A$, $B$, $\alpha$ and $D$ are chosen empirically to produce a smooth uniform spiral. The retrace control 50, responsive to time flips the spiral back to the starting condition. As long as signals of this type are introduced to amplifiers 36 and 37 the scanner drive circuit will work as explained to produce the desired precessing motion of mirror 20 to constitute a spiral scan. Any convenient method of generating the appropriate signals which can be used to produce the results are within the concepts of this invention. The specific waveform generator 4 used in this implementation is not a limitation on the invention since the desired signals could be generated by various analog or digital devices or by a tape-controlled signal generator. The waveform generator 4 of FIG. 6 will be explained below.

Figure 8:
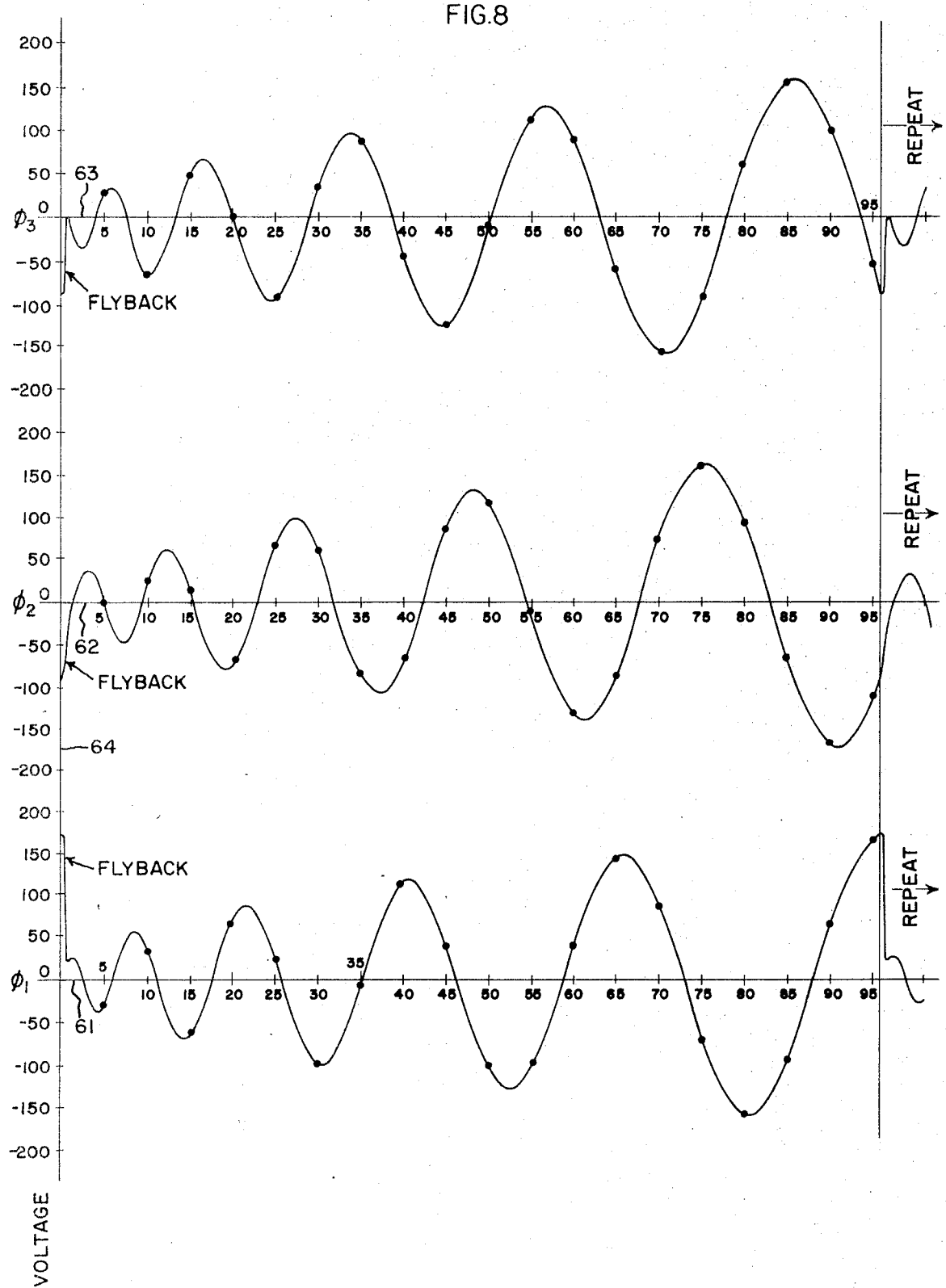
FIG. 8 illustrates the relationship of the transducer drive voltage.
Figure 9:
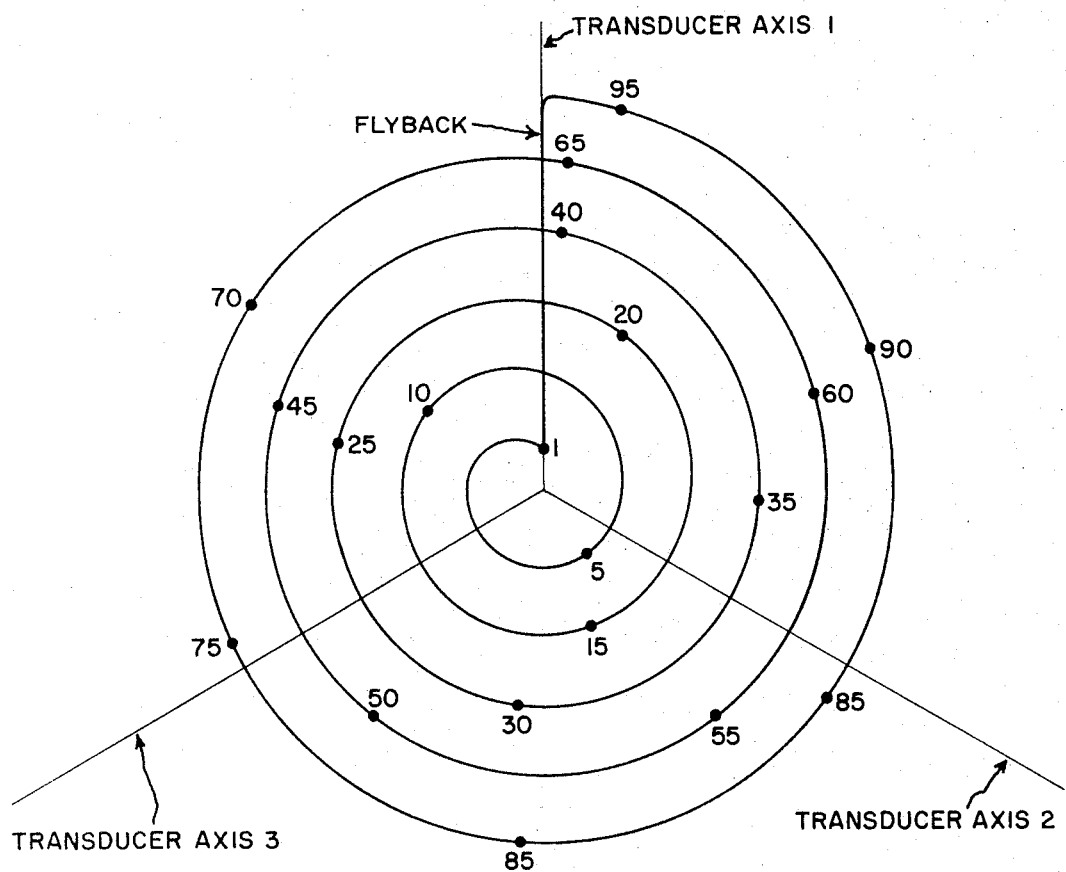
FIG. 9 illustrates the spiral pattern generated by the scanner.

The interrelated voltages $\phi_1$, $\phi_2$ and $\phi_3$ in branches 31, 32 and 33 respectively of the delta circuit 30 cause the transducers to move in a way that may be functionally illustrated in FIGS. 8 and 9. In FIG. 8, the three phase related signals are plotted as $\phi_1$, $\phi_2$ and $\phi_3$ on separate abscissas 61, 62 and 63 and as a function of time on the common ordinate 64. The waves representing the three signals illustrate the 120° relationship. As the sinusoidal oscillations increase in magnitude, the frequency decreases (or vice versa for reverse spiral) with the result that each oscillation takes an increasing length of time. When coordinated with a laser which is pulsed at a constant rate, each cycle of the wave will be accomplished by an increasing number of laser pulses. This feature serves to provide a fairly uniform coverage of the target area as illustrated in FIG. 9 because each successive convolution of the spiral contains an increasing number of laser pulses maintaining a fairly even spacing of bursts of light on the target area. This will of course appear to an observer watching a display scope (which is explained in connection with the waveform generator) as a spiral which will move quite rapidly at first and then decrease in speed as it approaches the flyback point. In FIGS. 8 and 9, not all of the laser pulses are illustrated. The intervening pulses can be interpolated from the numbered pulses shown.

Optimum utilization of the piezoelectric material as referred to above would include operation of the system, to the extent feasible, with a constant voltage applied to the transducers, which voltage is just less than the voltage which would cause depoling. Constant voltage is difficult to attain since some variations of voltage are practically inherent in such system. The necessary volume efficiency of transducers because of the limited space around the small mirror requires operation of the transducers as nearly as possible under a constant maximum load. It appears that maximum voltage is beneficial for rapid deflections of the material centrally of the spiral and also for the larger displacements near the periphery of the spiral. The optimum should be obtainable through use of a constant voltage with spiralling accomplished by frequency variation. In the implementation of FIG. 6 wherein signals $v_2$ and $v_3$ are constant maximum amplitude signals, their application directly to amplifiers 36 and 37 in combination with a proper mass to frequency relationship in the mirror should permit a spiral pattern responsive to controlled variations in frequency. In the implementation of FIG. 6, the integrators 45 and 46 perform the conversion of the constant amplitude variable frequency signals $v_2$ and $v_3$ to the variable amplitude spiral scan signal.

WAVEFORM GENERATOR

The waveform generator 4 which is shown in schematic diagram on the left-hand side of FIG. 6 is one means of mechanizing this invention, but is neither a part of nor limiting on the concept of the invention. Generation of the scan signals by means of the waveform generator 4 is accomplished in three steps. The first step is to generate an exponential voltage wave shape $v_1$ according to the equation:

$$v_1 = K(Ae^{-\alpha t} + B)$$

where $K$ is in volts/Hertz, $A$ and $B$ are in Hertz, alpha is in 1/seconds, and $t$ is in seconds. This is accomplished by exponential waveform generator 40 which is shown in more detail in FIG. 7 wherein the generator 40 is shown to be the combination of a pulse generator 41 and the specific circuitry illustrated at 42. The resulting signal $v_1$ is applied to voltage controlled oscillators (VCO) which include, as an inherent characteristic, the voltage to frequency conversion constant $K$ indicated. In the case of application of signal $v_1$ to the VCO of the master channel, operation produces a second signal $v_2$ according to:

$$v_2 = C \sin [2\pi(Ae^{-\alpha t} + B)t]$$

where $C$ is in volts and $A$, $B$ and alpha are as defined above. Therefore, $v_2$ is a constant amplitude sine wave with a controlled frequency function. The third step is to convert this signal to a varying frequency, varying amplitude signal used to produce the spiral as previously explained and is accomplished by integrator 45 which generates a signal $v_4$ according to equation:

$$v_4 = D/Ae^{-\alpha t} + B \sin [2\pi(Ae^{-\alpha t} + B)t],$$

where $B$ is the volt/Hertz and other quantities are as previously defined. $v_4$ signal is the signal previously described as applied to amplifier 36 in the scanner drive circuit. The parallel cosine signal $v_5$ is generated in an analogous manner by voltage controlled oscillator 44 which is frequency slaved to the master VCO 43 and integrator 46. Phase synchronization is indicated by the connection 47 between the master and slave VCO's. This is a well known operation available on commercial VCO equipment. The phase synchronization signal is also fed to a counter 48 which is used to determine the time length of each scan sequence. After a predetermined number of rotations of phase advancement the scan will be retriggered by initiating a new time period for the exponential waveform. Normally this is done while $v_2 = 0$. However the cosine function as represented by $v_5$ must be retrace modified since it is not zero and does not have the same value before and after retrace. Consequently it is necessary to furnish a signal to the integrator 46 at 49 which is produced by retracing circuitry 50. The waveform generator 4 as diagramed in FIG. 6 also includes a monitor 70 which as indicated schematically has the X and Y input fed by signal $v_4$ and $v_5$, respectively. This X-Y connection will cause the scope to indicate the spiral drive scan. The intensity which is the Z axis as indicated is connected by amplifier 71 to the detector 12 which is the same detector as is illustrated in FIG. 1. In this way the spiral scan as driven by the X and Y inputs (which are signals $v_4$ and $v_5$) provide a directional relationship and the reflected radiation as converted to a signal by the detector 12 driving the Z input produces a brightness when there is an object deflecting light from the laser beam. Also illustrated but only optionally a part of such system are damping circuits 73 and 74 imposed between the integrators 45 and 46 and the scanner drive circuit. These components 73 and 74 may be used to damp the transducers electronically as a substitute for use of the resilient damping material 27 illustrated in FIGS. 2 and 3. This waveform generator 4 as explained provides a simple method of achieving amplitude vs. time tailoring by varying the RC network and thereafter tailoring of the exponential voltage controlled oscillator input waveshape. Since the purpose of the description of waveform generator 4 is primarily to permit another to practice the invention and to indicate that we have actually accomplished the invention, the following list of commercially available components from which the invention can be mechanized is provided:

Amplifier 71 — Tektronix No. 132 Amp with 53/54 c pre-amp

Monitor 70 — Tektronix No. 564 oscilloscope 381 and 386 pre-amp

Counter 38 — Tektronix No. 545 oscilloscope with 53/54 pre-amp

Pulse generator 41 — Rutherford B7B pulse generator

Voltage controlled oscillators 43, 44 — Wavetek 114

Retrace control 50 — EH No. 139B pulse generator

It is obvious that other implementations may be made within the concepts of this invention without departing from it. It is also considered not only possible but useful under certain circumstances to mechanize the invention by means of individually generated signals for two of the three signals $\phi_1$, $\phi_2$ or $\phi_3$. Under these circumstances the two signals can drive a three phase system, and even the transformers 34 – 35 could be omitted.

What we claim as new and desire to secure by letters patent of the United States is:

1. An optical scanner for use in an optical system to cause coordinated scanning by two beams of light, as for example a projected beam and a reflected beam, and about which the beams are folded comprising:
    a. a two-sided mirror for simultaneously reflecting two beams of light, one from each of said mirror surfaces;
    b. supporting structure surrounding said mirror and spaced from the peripheral edge thereof for fixedly mounting said scanner in a system;
    c. electromechanical transducer means including a plurality of paired piezoelectric benders attached at opposite points of said peripheral edge and to said structure for supporting said mirror and for deflecting said mirror about plural axes, one of which is orthogonal to each bender pair, in response to electrical signals applied to said benders; and
    d. plural phase electronic signal generating means, one phase coupled to each of said bender pairs to effect circular scanning, said signals incrementing in amplitude in timed relation to said circular scanning to effect a spiral area scanning pattern.

2. An optical scanner for use in an optical system to cause coordinated scanning by two beams of light, as for example a projected beam and a reflected beam and about which the beams are folded comprising:
    a. a two-sided mirror having two proximate planar mirror surfaces and a peripheral edge for simultaneously reflecting two beams of light, one from each of said mirror surfaces;
    b. supporting structure surrounding said mirror spaced from said peripheral edge for fixedly mounting said scanner in a system;
    c. electromechanical transducer means including a plurality of paired diametrically opposed piezoelectric benders interconnecting said peripheral edge and said supporting structure for supporting said mirror and for deflecting said mirror about plural axes orthogonal each bender pair and parallel to said mirror surfaces in response to electrical signals applied to said benders; and
    d. plural phase electronic signal generating means for generating and applying said signals to said benders with a separate phase coupled to each of said bender pairs, said signals being varying frequency, varying amplitude signals and being phase related to correspond to the spacing of said pairs about said mirror to cause said mirror to effect a regular area scan pattern.

3. In an optical scanner having utility in an optical system providing for coordinated scanning by two beams of light, as for example, a projected beam and a reflected beam folded about said scanner, wherein the scanner includes a planar two-sided mirror having a peripheral edge supported from a surrounding structure by a plurality of piezoelectric transducers each cantilevered at one end to said structure and articulately connected at the other to said peripheral edge, said transducers being generally in the plane of said mirror when at rest and being evenly spaced around said edge in diametrically opposed pairs and connected by electrical circuitry to a generator for producing signals to cause said transducers to move in bending fashion, each said pair deflecting said mirror about an axis in the plane of the mirror normal to the axis of alignment of said pair, the improvement wherein:
    a. said generator includes means for generating a number of phase-related sinusoidal varying frequency, varying amplitude voltage signals of similar waveform equal in number to the number of said diametrically opposed pairs of said transducers, said signals being phase-related according to the number of said pairs in the relationship the angles subtended between said axes of alignment of said adjacent pairs of transducers from the point of intersection of said axes of alignment; and
    b. said electrical circuitry includes circuit means for distributing each of said signals to a distinct one of said pairs with said signals being applied to the individual transducers of each pair with opposite polarity to cause said pairs of transducers to torque said mirror in a sequence responsive to the phase relationship of the signals with a repetition and to a degree responsive to the frequency and amplitude of said signals;
    whereby activation of said generator and application of said signals cause said mirror to oscillate with a pattern determined by the number of said pairs and the nature of said signals to effect a regular area scan.

4. In the optical scanner of claim 3, the further improvement wherein
there are six said transducers arranged in three diametrically opposed pairs and the axes of alignment of said pairs subtend an angle of 60°; and
said means for generating further comprise:
1. a waveform generator generating two varying amplitude, varying frequency voltage signals related as sine and cosine and including a retrace control to cause said signals to "fly back" from a predetermined maximum amplitude, minimum frequency to a minimum amplitude, maximum frequency; and
2. a transducer drive circuit including two Scott connected transformers responsive to said sine and cosine related voltage signals to produce three said similar waveform sinusoidal varying frequency, varying amplitude voltage signals having a mutual phase relationship of 120° to cause said mirror to precess about a line in space through said point of intersection and normal to said mirror, and "fly back" and repeat said precession;
whereby oscillation of said mirror causes a beam of light reflected by either said planar mirror surface to define a repetitious circular spiral span pattern.

* * * * *